(12) United States Patent
Qiao et al.

(10) Patent No.: US 11,919,824 B2
(45) Date of Patent: Mar. 5, 2024

(54) SILICON NITRIDE CERAMIC SINTERED BODY AND PREPARATION METHOD THEREOF

(71) Applicants: Lanzhou Institute of Chemical Physics, CAS, Lanzhou (CN); Yantai Zhongke Research Institute of Advanced Materials and Green Chemical Engineering, Yantai (CN); Shandong Laboratory of Yantai Advanced Materials and Green Manufacturing, Yantai (CN)

(72) Inventors: Zhuhui Qiao, Lanzhou (CN); Lujie Wang, Lanzhou (CN); Tongyang Li, Lanzhou (CN); Ziyue Wang, Lanzhou (CN); Yuan Yu, Lanzhou (CN); Huaguo Tang, Lanzhou (CN)

(73) Assignees: Lanzhou Institute of Chemical Physics, CAS, Lanzhou (CN); Yantai Zhongke Research Institute of Advanced Materials and Green Chemical Engineering, Yantai (CN); Shandong Laboratory of Yantai Advanced Materials and Green Manufacturing, Yantai (CN)

(*) Notice: Subject to any disclaimer, the term of this patent is extended or adjusted under 35 U.S.C. 154(b) by 0 days.

(21) Appl. No.: 18/199,423

(22) Filed: May 19, 2023

(65) Prior Publication Data
US 2024/0043349 A1 Feb. 8, 2024

(30) Foreign Application Priority Data

Aug. 8, 2022 (CN) .......................... 202210941639.4

(51) Int. Cl.
*C04B 41/45* (2006.01)
*C04B 35/587* (2006.01)
(Continued)

(52) U.S. Cl.
CPC ........ *C04B 41/4556* (2013.01); *C04B 35/587* (2013.01); *C04B 35/6261* (2013.01);
(Continued)

(58) Field of Classification Search
None
See application file for complete search history.

(56) References Cited

U.S. PATENT DOCUMENTS 4,876,148 A * 10/1989 Virkar ................... C04B 35/645
428/397
5,908,796 A 6/1999 Pujari et al.
2003/0198417 A1* 10/2003 Yamamoto .............. F16C 33/32
384/492

FOREIGN PATENT DOCUMENTS

CN 106392081 A 2/2017
CN 108455990 A 8/2018
(Continued)

OTHER PUBLICATIONS

Chinese Office Action, Serial No. 202210941639.4, dated Nov. 21, 2022.
(Continued)

*Primary Examiner* — Jeffrey D Washville
(74) *Attorney, Agent, or Firm* — Reising Ethington, P. C.

(57) ABSTRACT

Disclosed are a silicon nitride ceramic sintered body and preparation method thereof. The silicon nitride ceramic sintered body includes a sintered bulk and a hard surface layer having a thickness of 10-1000 μm, formed on a surface of the sintered bulk, wherein the sintered bulk comprises a first silicon nitride crystalline phase and a first grain bound-
(Continued)

ary phase; the hard surface layer comprises a second silicon nitride crystalline phase and a second grain boundary phase; the first grain boundary phase comprises a metal tungsten phase being tungsten elementary substance and/or a tungsten alloy; the second grain boundary phase comprises tungsten carbide particles; tungsten element in the metal tungsten phase accounts for 80-100 wt % of total tungsten element in the first grain boundary phase; and tungsten element in the tungsten carbide particles accounts for 60-100 wt % of total tungsten element in the second grain boundary phase.

12 Claims, 1 Drawing Sheet

(51) Int. Cl.
    *C04B 35/626*     (2006.01)
    *C04B 35/645*     (2006.01)
    *C04B 35/76*     (2006.01)
    *C04B 41/00*     (2006.01)

(52) U.S. Cl.
    CPC ............ *C04B 35/645* (2013.01); *C04B 35/76* (2013.01); *C04B 41/0072* (2013.01); *C04B 2235/3206* (2013.01); *C04B 2235/3217* (2013.01); *C04B 2235/3225* (2013.01); *C04B 2235/3227* (2013.01); *C04B 2235/3258* (2013.01); *C04B 2235/3813* (2013.01); *C04B 2235/3873* (2013.01); *C04B 2235/3891* (2013.01); *C04B 2235/404* (2013.01); *C04B 2235/428* (2013.01); *C04B 2235/5216* (2013.01); *C04B 2235/5436* (2013.01); *C04B 2235/5445* (2013.01); *C04B 2235/656* (2013.01); *C04B 2235/658* (2013.01); *C04B 2235/85* (2013.01)

(56) References Cited

FOREIGN PATENT DOCUMENTS

| | | |
|---|---|---|
| CN | 110117192 A | 8/2019 |
| CN | 114163244 A | 3/2022 |
| CN | 114315358 A | 4/2022 |

OTHER PUBLICATIONS

Title: Effect of Tungsten Carbide on Microstructure and Mechanical Properties of Nano-size Silicon Nitride Ceramic, Authors: Maohua Lu Chunyan Tian, and Ning Liu, Cemented Carbide vol. 24 No. 1, Date: Mar. 2007.
Title: Foundations of Power Metallurgy, Southern Institute of Mining and Metallurgy, Metallurgical Industry Press, p. 28, Dec. 1974.
CN Notification to Grant Patent Right for Invention, Application No. 202210941639.4, Applicant: Lanzhou Institute of Chemical Physics, CAS, Yantai Zhongke Research Institute of Advanced Materials and Green Chemical Engineering, Shandong Laboratory of Yantai Advanced Materials, Title: Silicon Nitride Ceramic Sintered Body and Preparation Method Thereof, dated Jan. 11, 2023.

* cited by examiner

SILICON NITRIDE CERAMIC SINTERED BODY AND PREPARATION METHOD THEREOF

CROSS REFERENCE TO RELATED APPLICATION

This patent application claims the benefit and priority of Chinese Patent Application No. 202210941639.4 filed on Aug. 8, 2022, the present disclosure of which is incorporated by reference herein in its entirety as part of the present application.

TECHNICAL FIELD

The present disclosure belongs to the technical field of ceramic materials, in particular to a silicon nitride ceramic sintered body and a preparation method thereof.

BACKGROUND ART

Silicon nitride is widely used in machinery, metallurgy, aviation and other fields due to its high strength, high toughness, high hardness, high thermal shock resistance and other properties. Its properties depend on the density, grain size distribution and length/diameter ratio of silicon nitride, and the properties of grain boundary phase.

Various preparation processes could achieve the improvement of bending strength, fracture toughness and hardness of silicon nitride ceramics, which always lead to the improvement of one performance along with the reduction of another performance. Taking as an example, reduced average grain size of ceramics can improve the strength of silicon nitride ceramics, but also lead to the reduction of the toughness of silicon nitride ceramics, while the increased grain size of silicon nitride ceramics would increase the toughness but reduce the strength. If a second phase such as boron nitride particles is introduced to improve the toughness, the hardness of ceramic materials would be reduced. To sum up, there are certain mutual constraints among the properties of ceramic materials, and it is often difficult to improve the properties simultaneously.

However, as a structural material, the bending strength, fracture toughness and hardness of silicon nitride ceramics are very important indexes in practical applications. High strength can ensure the bearing of large loads, high toughness can prevent the failure of ceramic materials in case of defects to improve its stability, and high hardness can impart ceramic materials excellent wear resistance and penetration resistance. Therefore, it is very important to simultaneously improve the strength, toughness and hardness of ceramic materials.

SUMMARY

The present disclosure provides a silicon nitride ceramic sintered body and a preparation method thereof. The silicon nitride ceramic sintered body according to the present disclosure has the characteristics of high surface hardness and high toughness of the bulk.

The present disclosure provides the following technical solutions.

The present disclosure provides a silicon nitride ceramic sintered body, which includes a sintered bulk, and a hard surface layer having a thickness of 10-1000 formed on a surface of the sintered bulk, wherein the sintered bulk comprises a first silicon nitride crystalline phase and a first grain boundary phase, and the hard surface layer comprises a second silicon nitride crystalline phase and a second grain boundary phase, wherein the first grain boundary phase comprises a metal tungsten phase, the metal tungsten phase being tungsten elementary substance and/or a tungsten alloy; wherein the second grain boundary phase comprises tungsten carbide particles; wherein tungsten element in the metal tungsten phase accounts for 80-100 wt % of total tungsten element in the first grain boundary phase; and wherein tungsten element in the tungsten carbide particles accounts for 60-100 wt % of total tungsten element in the second grain boundary phase.

In some embodiments, the metal tungsten phase and tungsten carbide particles account for 0.5 to 35 vol % the silicon nitride ceramic sintered body.

In some embodiments, the first silicon nitride crystalline phase in the sintered bulk and the second silicon nitride crystalline phase of the hard surface layer account for 50 to 90 vol % of the silicon nitride ceramic sintered body.

In some embodiments, the tungsten carbide particles have an average particle size of 0.5 to 50 μm.

The present disclosure provides a method for preparing the silicon nitride ceramic sintered body as described in the above technical solutions, including the following steps:

burying a tungsten toughened silicon nitride ceramic sintered body in a burying powder; and subjecting the tungsten toughened silicon nitride ceramic sintered body to a heat treatment for a carbonization reaction, to obtain the silicon nitride ceramic sintered body, wherein the tungsten toughened silicon nitride ceramic sintered body comprises a third silicon nitride crystalline phase and a metal tungsten grain boundary phase, the metal tungsten grain boundary phase being tungsten elementary substance and/or a tungsten alloy; and wherein the burying powder comprises a carbon source.

In some embodiments, the carbon source accounts for 20-100 wt % of the burying powder.

In some embodiments, the heat treatment is performed at a temperature of 1100-1450° C. for 0.5-5 h.

In some embodiments, the tungsten toughened silicon nitride ceramic sintered body is prepared by a process comprising steps of mixing and ball milling a silicon nitride source, a metal tungsten grain boundary phase precursor, and a sintering assistant, to obtain a mixed powder; and forming the mixed powder into a preform, and sintering the preform in a nitrogen atmosphere, to obtain the tungsten toughened silicon nitride ceramic sintered body, wherein the metal tungsten grain boundary phase precursor is at least one selected from the group consisting of tungsten elementary substance, a tungsten alloy, and an organic tungsten compound.

In some embodiments, the silicon nitride source accounts for 60-90 vol % of the mixed powder, and the metal tungsten grain boundary phase precursor accounts for 0.5-35 vol % of the mixed power.

In some embodiments, the sintering is performed at a temperature of 1600-1900° C. and at a nitrogen pressure of not less than 0.3 MPa.

The present disclosure provides a silicon nitride ceramic sintered body, which comprises a sintered bulk, and a hard surface layer having a thickness of 10-1000 μm, formed on a surface of the sintered bulk, wherein the sintered bulk comprises a first silicon nitride crystalline phase and a first grain boundary phase, and the hard surface layer comprises a second silicon nitride crystalline phase and a second grain boundary phase, wherein the first grain boundary phase comprises a metal tungsten phase, the metal tungsten phase being tungsten elementary substance and/or a tungsten alloy; wherein the second grain boundary phase comprises tungsten carbide particles; wherein tungsten element in the metal tungsten phase accounts for 80-100 wt % of total tungsten element in the first grain boundary phase; and wherein tungsten element in the tungsten carbide particles accounts for 60-100 wt % of total tungsten element in the second grain boundary phase. In the present disclosure, tungsten carbide particles in the hard surface layer could improve the surface hardness of the silicon nitride ceramic sintered body, and the improved surface hardness is conducive to improving the wear resistance of the silicon nitride ceramic sintered body. The metal tungsten phase in the sintered bulk according to the present disclosure is conducive to improving the fracture toughness of the bulk of the silicon nitride ceramic sintered body, and the improved fracture toughness is conducive to improving the wear resistance of the silicon nitride ceramic sintered body. Also, in the present disclosure, the thickness of the hard surface layer is controlled to be 10-1000 μm, and the tungsten element in the metal tungsten phase accounts for 80-100 wt % of the total tungsten element in the first grain boundary phase, and the tungsten element in the tungsten carbide particles accounts for 60-100 wt % of the total tungsten element in the second grain boundary phase. Therefore, through the difference between the surface composition and the internal composition, the silicon nitride ceramic sintered body according to the present disclosure finally achieves a surface layer of high hardness and a bulk of high toughness, thereby having characteristics of high toughness, high hardness and wear resistance.

The present disclosure provides a method for preparing the silicon nitride ceramic sintered body as described in the above technical solutions, which includes the following steps: burying a tungsten toughened silicon nitride ceramic sintered body in a burying powder; and subjecting the tungsten toughened silicon nitride ceramic sintered body to a heat treatment for a carbonization reaction, to obtain the silicon nitride ceramic sintered body, wherein the tungsten toughened silicon nitride ceramic sintered body includes a third silicon nitride crystalline phase and a metal tungsten grain boundary phase, the metal tungsten grain boundary phase being tungsten elementary substance and/or a tungsten alloy, and wherein the burying powder includes a carbon source. In the method according to the present disclosure, the tungsten toughened silicon nitride ceramic sintered body is used as a raw material for the pack cementation and heat treatment. The metal tungsten grain boundary phase is conducive to improving the toughness of the tungsten toughened silicon nitride ceramic sintered body, and the metal tungsten grain boundary phase on the surface of the tungsten toughened silicon nitride ceramic sintered body reacts with the carbon source in the burying powder during the pack cementation and heat treatment, forming a hard surface layer containing tungsten carbide particles, thereby improving the surface hardness of the silicon nitride ceramic sintered body. The method according to the present disclosure is simple and feasible, and thus is suitable for industrialization production.

DETAILED DESCRIPTION OF THE EMBODIMENTS

Figure 1:
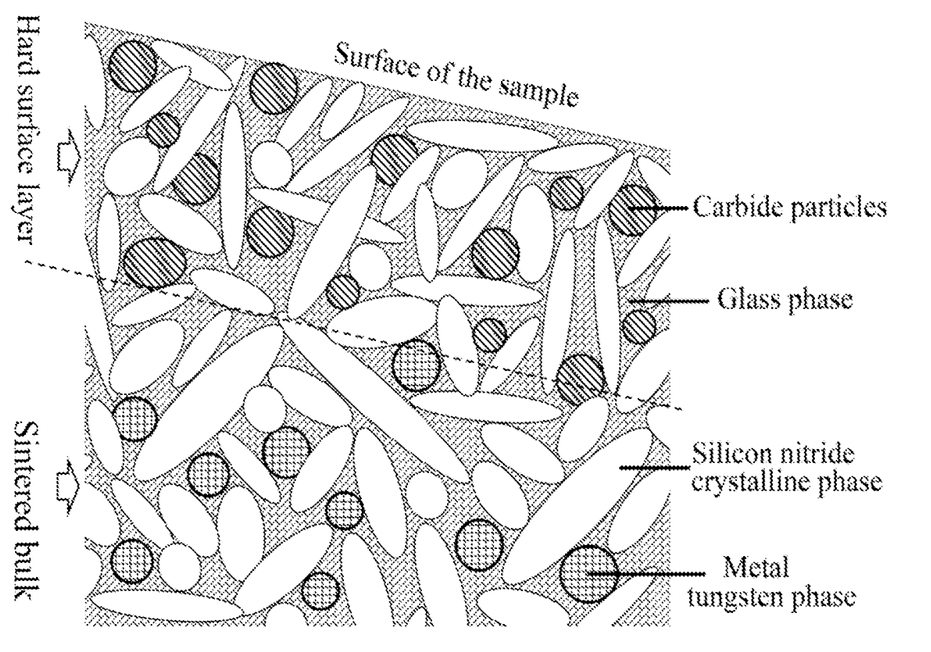
FIGURE shows a schematic diagram of the composition of the silicon nitride sintered body prepared in Example 1 according to the present disclosure.

The present disclosure provides a silicon nitride ceramic sintered body, which includes a sintered bulk and a hard surface layer having a thickness of 10-1000 μm, formed on a surface of the sintered bulk, wherein the sintered bulk includes a first silicon nitride crystalline phase and a first grain boundary phase, and the hard surface layer includes a second silicon nitride crystalline phase and a second grain boundary phase, wherein the first grain boundary phase includes a metal tungsten phase, the metal tungsten phase being tungsten elementary substance and/or a tungsten alloy; wherein the second grain boundary phase includes tungsten carbide particles; wherein tungsten element in the metal tungsten phase accounts for 80-100 wt % of total tungsten element in the first grain boundary phase; and wherein tungsten element in the tungsten carbide particles accounts for 60-100 wt % of total tungsten element in the second grain boundary phase.

In the present disclosure, unless otherwise specified, all raw materials/components for preparation are commercially available products well-known to those skilled in the art.

The silicon nitride ceramic sintered body according to the present disclosure includes a sintered bulk.

In the present disclosure, the sintered bulk includes a first silicon nitride crystalline phase and a first grain boundary phase, and the first grain boundary phase includes a metal tungsten phase, the metal tungsten phase being tungsten element and/or a tungsten alloy.

In some embodiments of the present disclosure, the first grain boundary phase is diffusely distributed in the sintered bulk.

In some embodiments of the present disclosure, the tungsten elementary substance includes tungsten elementary substance particles and/or tungsten elementary substance fibers.

In some embodiments of the present disclosure, the tungsten elementary substance particles have an average particle size of 0.5-50 μm, and preferably 10-40 μm.

In some embodiments of the present disclosure, the tungsten elementary substance fiber has a diameter of 0.2-20 μm, and preferably 0.5-15 μm.

In some embodiments of the present disclosure, the tungsten alloy includes at least one selected from the group consisting of a potassium-doped tungsten alloy, a thorium oxide-doped tungsten alloy, a tungsten-rhenium alloy, a hafnium- and carbon-doped tungsten alloy, a molybdenum-doped tungsten alloy, $W_5Si_3$, and WB.

In some embodiments of the present disclosure, the tungsten alloy includes tungsten alloy particles and/or tungsten alloy fibers.

In some embodiments of the present disclosure, the tungsten alloy particles have an average particle size of 0.5-50 μm, and preferably 10-40 μm.

In some embodiments of the present disclosure, the tungsten alloy fiber has a diameter of 0.2-20 μm, and preferably 0.5-15 μm.

In some embodiments of the present disclosure, in the first grain boundary phase, the tungsten element in the metal tungsten phase accounts for 80-100 wt %, preferably 85 to 100 wt % of the total tungsten element in the first grain boundary phase.

In some embodiments of the present disclosure, the tungsten element in the metal tungsten phase accounts for 80-100 wt % of the total tungsten element in the first grain boundary phase, which is conducive to the improvement of the fracture toughness of the silicon nitride ceramic sintered body. The improved fracture toughness is further conducive to improving the wear resistance of the silicon nitride ceramic sintered body.

The silicon nitride ceramic sintered body according to the present disclosure comprises a hard surface layer formed on a surface of the sintered bulk.

In the present disclosure, the hard surface layer includes a second silicon nitride crystalline phase and a second grain boundary phase, the second grain boundary phase including tungsten carbide particles.

In the present disclosure, the hard surface layer has a thickness of 10-1000 µm, and preferably 10-500 µm.

In the present disclosure, in the second grain boundary phase, the tungsten element in the tungsten carbide particles accounts for 60-100 wt %, preferably 65-100 wt % of the total tungsten element in the second grain boundary phase.

In some embodiments of the present disclosure, in the second grain boundary phase, the tungsten element in the tungsten carbide particles accounts for not less than 60 wt % and less than 100 wt % of the total tungsten element in the second grain boundary phase. In some embodiments, the second grain boundary phase further includes a metal tungsten phase, the metal tungsten phase being a tungsten elementary substance and/or a tungsten alloy. In some embodiments, the second grain boundary phase consists of tungsten carbide particles and a metal tungsten phase.

In some embodiments of the present disclosure, the tungsten carbide particles have an average particle size of 0.5-50 µm, and preferably 1-45 µm.

In the present disclosure, the tungsten carbide particles in the hard surface layer are conducive to improving the surface hardness of the silicon nitride ceramic sintered body material, and the improved hardness is further conducive to improving the wear resistance of the silicon nitride ceramic sintered body.

In some embodiments of the present disclosure, the metal tungsten phase and tungsten carbide particles account for 0.5-35 vol %, preferably 1-25 vol % of the silicon nitride ceramic sintered body.

In some embodiments of the present disclosure, the first silicon nitride crystalline phase in the sintered bulk and the second silicon nitride crystalline phase in the hard surface layer account for 60-90 vol %, and preferably 62-90 vol % of the silicon nitride ceramic sintered body.

In some embodiments of the present disclosure, in the silicon nitride ceramic sintered body, the volume percentage of the first and second silicon nitride crystalline phase is in a range of 60-90 vol %. In some embodiments, the total volume percentage of the first grain boundary phase and the second grain boundary phase is in a range of 0.5-35 vol %. Further, the silicon nitride ceramic sintered body according to the present disclosure has a structure of the sintered bulk and the hard surface layer, and thereby has the characteristics of high toughness, high hardness, and wear resistance due to the difference between the surface composition and inner composition in the silicon nitride ceramic sintered body.

The present disclosure provides a method for preparing the silicon nitride ceramic sintered body as described in the above technical solutions, including the following steps:
    burying a tungsten toughened silicon nitride ceramic sintered body in a burying powder; and
    subjecting the tungsten toughened silicon nitride ceramic sintered body to a heat treatment for a carbonization reaction, to obtain the silicon nitride ceramic sintered body,
    wherein the tungsten toughened silicon nitride ceramic sintered body comprises a third silicon nitride crystalline phase and a metal tungsten grain boundary phase, the metal tungsten grain boundary phase being tungsten elementary substance and/or a tungsten alloy; and
    wherein the burying powder comprises a carbon source.

In some embodiments of the present disclosure, the carbon source includes at least one selected from the group consisting of a graphite powder, a carbon black powder, a carbon-containing organic substance, and a diamond powder.

In some embodiments of the present disclosure, the carbon-containing organic substance includes a saccharide and/or a phenolic resin.

In some embodiments of the present disclosure, the metal tungsten grain boundary phase accounts for 0.5-35 vol %, preferably 0.8-35 vol % of the tungsten toughened silicon nitride ceramic sintered body.

In some embodiments of the present disclosure, the tungsten toughened silicon nitride ceramic sintered body is prepared by a process including the following steps:
    mixing and ball milling a silicon nitride source, a metal tungsten grain boundary phase precursor, and a sintering assistant, to obtain a mixed powder;
    forming the mixed powder into a preform, and sintering the preform in a nitrogen atmosphere, to obtain the tungsten toughened silicon nitride ceramic sintered body,
    wherein the metal tungsten grain boundary phase precursor is at least one selected from the group consisting of tungsten elementary substance, a tungsten alloy, and an organic tungsten compound.

In some embodiments of the present disclosure, the sintering is preformed in a nitrogen atmosphere, and the nitrogen gas inhibits the reaction of tungsten element in the metal tungsten grain boundary phase precursor with silicon nitride, so as to form a weak interface between the metal tungsten grain boundary phase and the third silicon nitride crystalline phase, which can effectively deflect cracks and improve the fracture toughness of the silicon nitride ceramic sintered body.

In some embodiments of the present disclosure, the silicon nitride source, the metal tungsten grain boundary phase precursor, and the sintering assistant are mixed and ball-milled, to obtain the mixed powder, the metal tungsten grain boundary phase precursor being at least one selected from the group consisting of tungsten elementary substance, a tungsten alloy, and an organic tungsten compound.

In some embodiments of the present disclosure, the silicon nitride source includes silicon nitride raw material and/or silicon elementary substance.

In some embodiments of the present disclosure, the silicon nitride raw material has an average particle size of 0.2-50 µm, preferably 1-45 µm, and more preferably 5-40 µm.

In some embodiments of the present disclosure, the silicon elementary substance has an average particle size of 0.2-100 µm, preferably 0.5-80 µm, and more preferably 2-75 µm.

In specific embodiments of the present disclosure, the silicon elementary substance is a silicon powder.

In some embodiments of the present disclosure, the metal tungsten grain boundary phase precursor is at least one selected from the group consisting of tungsten elementary substance, a tungsten alloy, and an organic tungsten compound.

In some embodiments of the present disclosure, the tungsten elementary substance includes tungsten elementary substance particles and/or tungsten elementary substance fibers.

In some embodiments of the present disclosure, the tungsten elementary substance particles have an average particle size of 0.5-50 μm, and preferably 10-40 μm.

In some embodiments of the present disclosure, the tungsten elementary substance fibers have a diameter of 0.2-20 μm, and preferably 0.5-15 μm.

In some embodiments of the present disclosure, the tungsten alloy includes at one selected from the group consisting of a potassium-doped tungsten alloy, a thorium oxide-doped tungsten alloy, a tungsten rhenium alloy, a hafnium- and carbon-doped tungsten alloy, a molybdenum-doped tungsten alloy, $W_5Si_3$, and WB.

In some embodiments of the present disclosure, the tungsten alloy includes tungsten alloy particles and/or tungsten alloy fibers.

In some embodiments of the present disclosure, the tungsten alloy particles have an average particle size of 0.5-50 μm, and preferably 10-40 μm.

In some embodiments of the present disclosure, the tungsten alloy fibers have a diameter of 0.2-20 μm, and preferably 0.5-15 μm.

In some embodiments of the present disclosure, the organic tungsten compound preferably includes $W(NH_4)_6$ and/or $H_2W_{12}O_{40}$.

In some embodiments of the present disclosure, the metal tungsten grain boundary phase precursor has an average particle size of 0.1-100 μm, preferably 1-80 μm, and more preferably 5-70 μm.

In some embodiments of the present disclosure, the sintering assistant includes a metal oxide, preferably includes at least one selected from the group consisting of $Al_2O_3$, MgO, and a rare earth oxide, and more preferably includes at least one selected from the group consisting of $Y_2O_3$, $Yb_2O_3$, $Sm_2O_3$, and $La_2O_3$.

In some embodiments of the present disclosure, the sintering assistant has an average particle size of 0.1-30 μm, and preferably 5-25 μm.

In some embodiments of the present disclosure, the amount of the sintering assistant is 3-15 vol %, preferably 6-10 vol % of the total volume of the silicon nitride source, and the metal tungsten grain boundary phase precursor, and the sintering assistant.

In some embodiments of the present disclosure, the silicon nitride source accounts for 50-90 vol % of the mixed powder, and the metal tungsten grain boundary phase precursor accounts for 0.5-35 vol % of the mixed power.

In some embodiments of the present disclosure, the mixing and ball milling is carried out in a planetary ball mill.

In some embodiments of the present disclosure, the ball milling is a wet milling.

In some embodiments of the present disclosure, a ball milling medium used during the mixing and ball milling is ethanol or water.

In some embodiments of the present disclosure, the water is deionized water.

In some embodiments of the present disclosure, ball milling beads used during the mixing and ball milling are aluminum oxide ball milling beads, silicon nitride ball milling beads, or agate ball milling beads.

In some embodiments of the present disclosure, during the mixing and ball milling, a mass ratio of powder raw materials, the ball milling medium, and the ball milling beads is 1:3:2.

In some embodiments of the present disclosure, the mixing and ball milling is performed at a rotational speed of 150-300 rpm.

In some embodiments of the present disclosure, the mixing and ball milling is performed for 0.5-8 h.

In some embodiments of the present disclosure, after obtaining the mixed powder, the mixed powder is formed into a preform, and the preform is sintered in a nitrogen atmosphere, to obtain the tungsten toughened silicon nitride ceramic sintered body.

In some embodiments of the present disclosure, the mixed powder is dried before the forming. In some embodiments of the present disclosure, the drying is a spray drying or a drying by stoving.

In some embodiments of the present disclosure, the drying by stoving is preformed at a temperature of 40-120° C.

In some embodiments of the present disclosure, the drying by stoving is preformed for 1-8 hours.

In the present disclosure, there is no special requirements on the specific implementation procedure of the spray drying.

In some embodiments of the present disclosure, the method further includes granulating by drying. In some embodiments of the present disclosure, the drying is a spray drying, and the mixed powder is directly obtained after the spray drying.

In some embodiments of the present disclosure, the drying is performed by stoving. In some embodiments, the method further includes sieving the material dried by stoving, to obtain the mixed powder. In some embodiments of the present disclosure, the sieving is preformed by using a sieve with pores 20-200 mesh in diameter, preferably 20 mesh, 60 mesh, 80 mesh or 200 mesh.

In some embodiments of the present disclosure, the forming is carried out according to Mode 1 or Mode 2 below, Mode 1: subjecting the mixed powder to an isostatic compaction; preferably, the isostatic compaction being performed at a pressure of 100-300 MPa, and more preferably 150-250 MPa;

Mode 2: subjecting the mixed powder to a dry pressing and an isostatic compaction in sequence; preferably the dry pressing being performed at a pressure of 10-80 MPa, and more preferably 15-70 MPa; preferably, the isostatic compaction being performed at a pressure of 100-300 MPa, and more preferably 150-250 MPa.

In some embodiments of the present disclosure, the sintering is performed at a temperature of 1600-1900° C., preferably, 1600° C., 1700° C., 1750° C., 1800° C. or 1850° C.

In some embodiments of the present disclosure, in the nitrogen atmosphere, the nitrogen pressure is not less than 0.3 MPa.

In some embodiments of the present disclosure, under the condition that the sintering is performed at 1600° C., the nitrogen pressure is not less than 0.3 MPa, and preferably not less than 0.5 MPa.

In some embodiments of the present disclosure, under the condition that the sintering is performed at 1700° C., the nitrogen pressure is not less than 2.5 MPa.

In some embodiments of the present disclosure, under the condition that the sintering is performed at 1750° C., the nitrogen pressure is not less than 4 MPa.

In some embodiments of the present disclosure, under the condition that the sintering is performed at 1800° C., the nitrogen pressure is not less than 6 MPa.

In some embodiments of the present disclosure, under the condition that the sintering is performed at 1850° C., the nitrogen pressure is not less than 11 MPa.

In the present disclosure, the nitrogen pressure is adjusted with the sintering temperature, that is to say, the lower nitrogen pressure is selected under the condition of a lower sintering temperature, and the relatively higher nitrogen pressure should be selected under the condition of higher sintering temperature, so that the metal tungsten grain boundary phase precursor can form tungsten elementary substance or a tungsten alloy, and the metal tungsten grain boundary phase formed from the directly-added metal tungsten grain boundary phase precursor coexists with silicon nitride or no chemical reaction therebetween occurs.

In some embodiments of the present disclosure, the sintering is a hot-press sintering or a spark plasma sintering in combination with gas pressure.

In some embodiments of the present disclosure, the carbon source includes an inorganic carbon source and/or an organic carbon source.

In some embodiments of the present disclosure, the carbon source includes at least one selected from the group consisting of a graphite powder, a carbon black powder, a fructose, a phenolic resin, and a diamond powder.

In some embodiments of the present disclosure, the carbon source accounts for 20-100 wt %, preferably 25-100 wt % of the burying powder.

In some embodiments of the present disclosure, under the condition that the carbon source accounts for not less than 20 wt % and less than 100 wt % of the burying powder, the burying powder further includes a silicon nitride powder and/or a boron nitride powder, and the burying powder consists of the silicon nitride powder and/or the boron nitride powder, and the carbon source.

In some embodiments of the present disclosure, under the condition that the burying powder further includes a silicon nitride powder and/or a boron nitride powder, the burying powder is prepared by a process including the following steps: subjecting the silicon nitride powder and/or the boron nitride powder, and the carbon source to a wet ball milling. In some embodiments of the present disclosure, the wet ball milling is carried out in a planetary ball mill. In some embodiments of the present disclosure, a medium for the wet ball milling is ethanol or water. In some embodiments of the present disclosure, the water is deionized water. In some embodiments of the present disclosure, ball milling beads used during the wet ball milling are aluminum oxide ball milling beads, silicon nitride ball milling beads or agate ball milling beads. In some embodiments of the present disclosure, a mass ratio of the total of the tungsten toughened silicon nitride ceramic sintered body and the burying powder, to the ball milling medium, and further to the ball milling beads is 2:3:2. In some embodiments of the present disclosure, the wet ball milling is performed at a rotational speed of 150-300 rpm. In some embodiments of the present disclosure, the wet ball milling is performed for 0.5-8 h.

In some embodiments of the present disclosure, the silicon nitride powder and/or boron nitride powder and the carbon source are subjected to a wet ball milling, to obtain a slurry. In some embodiments, the slurry is dried and screened, to obtain the burying powder. In some embodiments of the present disclosure, the drying is performed by stoving. In some embodiments of the present disclosure, the drying by stoving is performed at a temperature of 40-120° C. In some embodiments of the present disclosure, the drying by stoving is performed for 1-8 hours. In some embodiments of the present disclosure, the screening is performed by using a sieve with pores 20 mesh in diameter.

In some embodiments of the present disclosure, the heat treatment is performed at a temperature of 1100-1450° C., and preferably 1150-1400° C.

In some embodiments of the present disclosure, the heat treatment is performed for 0.5-5 h, and preferably 1-4.5 h.

In some embodiments of the present disclosure, the heat treatment is performed in an atmosphere of nitrogen or argon, or in vacuum.

In the present disclosure, in the prepared tungsten toughened silicon nitride ceramic sintered body, the metal tungsten grain boundary phase acts as a toughening phase. During the sintering, all or most of the metal tungsten grain boundary phase precursor forms metal tungsten elementary substance or a tungsten alloy. The metal tungsten grain boundary phase easily reacts with the silicon nitride sintered body at high temperature, nevertheless this reaction could be inhibited by nitrogen atmosphere or nitrogen pressure. Therefore, to effectively inhibit the occurrence of the reaction, nitrogen atmosphere or pressure is required during the sintering, and an increased nitrogen pressure is required with the increase of temperature, such that the weak interface between the metal tungsten grain boundary phase and the silicon nitride sintered body is formed, which can deflect cracks to improve the fracture toughness of the silicon nitride ceramic sintered body. During the heat treatment, the metal tungsten grain boundary phase on the surface of the sintered body reacts with carbon to form tungsten carbide particles, thereby improving the hardness of the surface layer.

For the first time, the present disclosure combines the advantages of metal tungsten grain boundary phase and tungsten carbide. First the metal tungsten grain boundary phase precursor is introduced to prepare a tungsten toughened silicon nitride ceramic sintered body with high toughness; a heat treatment is then adopted to make the metal tungsten grain boundary phase on the surface form tungsten carbide particles with high hardness to improve the surface hardness of the silicon nitride ceramic sintered body, thereby achieving a surface of high hardness and a bulk of high toughness.

The nitride ceramic sintered body according to the present disclosure has good bending strength, fracture toughness, friction and wear resistance, and can be used in machinery, metallurgy, aviation and other fields.

In the present disclosure, the three-point bending strength of the sample is tested by using a universal testing machine.

In the present disclosure, the room temperature fracture toughness of the sample is tested according to the grooving method.

In the present disclosure, the Vickers hardness of the sample is tested by using a Vickers hardness tester.

In the present disclosure, the wear resistance of the sample is tested by a self-mated ball-disk friction and wear test method.

It should be noted that the surface should be polished before the hardness, and friction and wear test, and the polishing depth should be lower than the thickness of the hard surface layer, otherwise the effect of surface hardening and improving wear resistance will not be achieved.

In order to further explain the present disclosure, the technical solutions according to the present disclosure are described in detail below in conjunction with the drawings and examples, but they cannot be understood as limiting the protection scope of the present disclosure.

EXAMPLE 1

100 g in total of silicon nitride powder (accounting for 80 vol % of the total), tungsten metal powder (accounting for 10 vol % of the total), aluminum oxide powder (accounting for 6 vol % of the total) and yttrium oxide powder (accounting for 4 vol % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 2 h, obtaining a mixed slurry.

The mixed slurry was dried in an oven at 60° C. for 5 h, and the resulting dried mixture was screened by using an 80-mesh sieve, obtaining a mixed powder which passed through the sieve.

The mixed powder was subjected to a dry pressing at a pressure of 10 MPa and then to an isostatic compaction at a pressure of 200 MPa, thereby being formed to a preform. The preform was sintered at 1750° C. and a nitrogen pressure of 10 MPa for 2 h, obtaining a tungsten toughened silicon nitride ceramic sintered body.

200 g in total of silicon nitride powder (accounting for 50 wt % of the total) and graphite powder (accounting for 50 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., a burying powder.

The tungsten toughened silicon nitride ceramic sintered body was buried in the above burying powder, and they were subjected to a heat treatment at 1300° C. in nitrogen atmosphere for 2 hours, obtaining a surface hardened silicon nitride ceramic sintered body.

The material sample was subjected to bending strength, fracture toughness, hardness, and friction and wear tests.

EXAMPLE 2

100 g in total of silicon powder (accounting for 20 vol % of the total), silicon nitride powder (accounting for 62 vol % of the total), metal tungsten fibers (accounting for 12 vol % of the total), magnesium oxide powder (accounting for 3 vol % of the total), and yttrium oxide powder (accounting for 3 vol % of the total) were put into a ball milling tank (made of polytetrafluoroethylene) of a planetary ball mill. 200 g of silicon nitride ball milling beads and 300 g of anhydrous ethanol were added thereto. The planetary ball mill (rpm=300) was operated for 2 h, obtaining a mixed slurry.

The mixed slurry was dried in an oven at 40° C. for 5 h, and the resulting dried mixture was screened by using a 100-mesh sieve, obtaining a mixed powder which passed through the sieve.

The mixed powder was directly subjected to an isostatic compaction at a pressure of 200 MPa, thereby being formed to a preform. The preform was sintered at 1800° C. and a nitrogen pressure of 10 MPa for 2 hours, obtaining a tungsten toughened silicon nitride ceramic sintered body.

200 g in total of boron nitride powder (accounting for 60 wt % of the total) and amorphous carbon black powder (accounting for 40 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., a burying powder.

The tungsten toughened silicon nitride ceramic sintered body was buried in the above burying powder, and they were subjected to a heat treatment at 1100° C. in argon atmosphere for 5 hours, obtaining a surface hardened silicon nitride ceramic sintered body.

The material sample was subjected to bending strength, fracture toughness, hardness, and friction and wear tests.

EXAMPLE 3

100 g in total of silicon powder (accounting for 81 vol % of the total), metal tungsten-rhenium alloy (rhenium content 5 wt %) powder (accounting for 5 vol % of the total), magnesium oxide powder (accounting for 8 vol % of the total), and ytterbium oxide powder (accounting for 6 vol % of the total) were put into a ball milling tank (made of silicon nitride) of a planetary ball mill. 200 g of alumina ball milling beads and 300 g of anhydrous ethanol were added thereto. The planetary ball mill (rpm=300) was operated for 2 h, obtaining a mixed slurry.

The mixed slurry was dried in an oven at 50° C. for 4 h, and the resulting dried mixture was screened by using a 60-mesh sieve, obtaining a mixed powder which passed through the sieve.

The mixed powder was subjected to a dry pressing at a pressure of 10 MPa and then to an isostatic compaction at a pressure of 200 MPa, thereby being formed to a preform. The preform was sintered at 1600° C. and a nitrogen pressure of 0.5 MPa for 8 h, obtaining a tungsten toughened silicon nitride ceramic sintered body.

The tungsten toughened silicon nitride ceramic sintered body was buried in pure graphite powder, and they were subjected to a heat treatment at 1200° C. in vacuum for 1 h, obtaining a surface hardened silicon nitride ceramic sintered body.

The material sample was subjected to bending strength, fracture toughness, hardness and friction and wear tests.

EXAMPLE 4

100 g in total of silicon powder (accounting for 62 vol % of the total), tungsten disilicide ($WSi_2$) powder (accounting for 20 vol % of the total), tungsten powder (accounting for 15 vol % of the total), magnesium oxide powder (accounting for 2 vol % of the total) and lanthanum oxide powder (accounting for 1 vol % of the total) were put into a ball milling tank (made of nylon) of a planetary ball mill. 200 g of silicon nitride ball milling beads and 300 g of anhydrous ethanol were added thereto. The planetary ball mill (rpm=150) was operated for 8 h, obtaining a mixed slurry.

The mixed slurry was dried in an oven at 40° C. for 12 h, and the resulting dried mixture was screened by using a 100-mesh sieve, obtaining a mixed powder which passed through the sieve.

The mixed powder was subjected to a dry pressing at a pressure of 40 MPa, and to an isostatic compaction at a pressure of 150 MPa, thereby being formed to a preform. The preform was sintered at 1600° C. and a nitrogen pressure of 1 MPa for 6 h, obtaining a tungsten toughened silicon nitride ceramic sintered body.

200 g in total of silicon nitride powder (accounting for 80 wt % of the total) and a phenolic resin (accounting for 20 wt % of the total) were put into a ball milling tank (made of silicon nitride) of a planetary ball mill. 200 g of agate ball milling beads and 300 g of anhydrous ethanol were added thereto. The planetary ball mill (rpm=300) was operated for 0.5 h, obtaining a slurry. The slurry was dried in an oven at 60° C. for 5 h, and cracked in vacuum at 600° C. for 2 h. The resulting mixture was screened by using a 20-mesh sieve, obtaining those passing through the sieve, i.e., a burying powder.

The tungsten toughened silicon nitride ceramic sintered body was buried in the above burying powder, and they were subjected to a heat treatment at 1400° C. in nitrogen atmosphere for 1 h, obtaining a surface hardened silicon nitride ceramic sintered body.

The material sample was subjected to bending strength, fracture toughness, hardness, and friction and wear tests.

EXAMPLE 5

100 g in total of silicon nitride powder (accounting for 80 vol % of the total), $W(NH_4)_6(H_2W_{12}O_{40})$ powder (accounting for 5 vol % of the total), aluminum oxide powder (accounting for 6 vol % of the total), samarium oxide powder (accounting for 9 vol % of the total) were put into a ball milling tank (made of silicon nitride) of a planetary ball mill. 200 g of silicon nitride ball milling beads and 300 g of anhydrous ethanol were added thereto. The planetary ball mill (rpm=200) was operated for 6 h, obtaining a mixed slurry.

The mixed slurry was directly spray granulated, obtaining a mixed powder.

The mixed powder was subjected to a dry pressing at a pressure of 20 MPa and then to an isostatic compaction at a pressure of 200 MPa, thereby being formed to a preform. The preform was sintered at 1700° C. and a nitrogen pressure of 3 MPa for 4 h, obtaining a tungsten toughened silicon nitride ceramic sintered body.

200 g in total of silicon nitride powder (accounting for 50 wt % of the total) and graphite powder (accounting for 50 wt % of the total) were put into a ball milling tank (made of silicon nitride) of a planetary ball mill. 200 g of silicon nitride ball milling beads and 300 g of deionized water were added thereto. The planetary ball mill (rpm=300) was operated for 0.5 h, obtaining a slurry. The slurry was dried in an oven at 80° C. for 5 h, and the resulting dried mixture was screened by using a 20-mesh sieve, obtaining those passing through the sieve, i.e., a burying powder.

The tungsten toughened silicon nitride ceramic sintered body was buried in the burying powder, and they were subjected to a heat treatment at 1450° C. in nitrogen atmosphere for 1 h, obtaining a surface hardened silicon nitride sintered body.

The material sample was subjected to bending strength, fracture toughness, hardness, and friction and wear tests.

EXAMPLE 6

100 g in total of silicon nitride powder (accounting for 90 vol % of the total), tungsten boride (WB) powder (accounting for 1 vol % of the total), aluminum oxide powder (accounting for 3 vol % of the total), and ytterbium oxide powder (accounting for 6 vol % of the total) were put into a ball milling tank (made of silicon nitride) of a planetary ball mill. 200 g of silicon nitride ball milling beads and 300 g of deionized water were added thereto. The planetary ball mill (rpm=300) was operated for 4 h, obtaining a mixed slurry.

The mixed slurry was dried in an oven at 80° C. for 2 h, and the resulting dried mixture was screened by using an 80-mesh sieve, obtaining a mixed powder which passed through the sieve.

The mixed power was subjected to a dry pressing at a pressure of 40 MPa, and then to an isostatic compaction at a pressure of 200 MPa, thereby being formed to a preform. The preform was sintered at 1900° C. and a nitrogen pressure of 20 MPa for 2 h, obtaining a tungsten toughened silicon nitride ceramic sintered body.

200 g in total of silicon nitride powder (accounting for 50 wt % of the total) and fructose powder (accounting for 50 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., a burying powder.

The tungsten toughened silicon nitride ceramic sintered body was buried in the above burying powder, and they were subjected to a heat treatment at 1300° C. in nitrogen atmosphere for 2 hours, obtaining a surface hardened silicon nitride ceramic sintered body.

The material sample was subjected to bending strength, fracture toughness, hardness, and friction and wear tests.

EXAMPLE 7

100 g in total of silicon nitride powder (accounting for 86 vol % of the total), tungsten metal powder (accounting for 0.5 vol % of the total), aluminum oxide powder (accounting for 3.5 vol %) and yttrium oxide powder (accounting for 10 vol % of the total) were put into a ball milling tank (made of silicon nitride) of a planetary ball mill. 200 g of agate ball milling beads and 300 g of deionized water were added thereto. The planetary ball mill (rpm=300) was operated for 2 h, obtaining a mixed slurry.

The mixed slurry was dried in an oven at 40° C. for 8 h, and the resulting dried mixture was screened by using a 200-mesh sieve, obtaining a mixed powder which passed through the sieve.

The mixed powder was sintered by a hot pressing at 1500° C. and a pressure of 40 MPa in nitrogen atmosphere, obtaining a tungsten toughened silicon nitride ceramic sintered body.

200 g in total of boron nitride powder (accounting for 80 wt % of the total) and diamond powder (accounting for 20 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., a burying powder.

The tungsten toughened silicon nitride ceramic sintered body was buried in the burying powder, and they were subjected to a heat treatment at 1450° C. in nitrogen atmosphere for 1 h, obtaining a surface hardened silicon nitride ceramic sintered body.

The material sample was subjected to bending strength, fracture toughness, hardness, and friction and wear tests.

EXAMPLE 8

100 g in total of silicon nitride powder (accounting for 80 vol % of the total), tungsten metal powder (accounting for 8 vol % of the total), aluminum oxide powder (accounting for 7 vol % of the total), and yttrium oxide powder (accounting for 5 vol % of the total) were put into a ball milling tank (made of silicon nitride) of a planetary ball mill. 200 g of silicon nitride ball milling beads and 300 g of deionized water were added thereto. The planetary ball mill (rpm=300) was operated for 4 h, obtaining a mixed slurry.

The mixed slurry was directly spray granulated, obtaining a mixed powder.

The mixed powder was sintered by a spark plasma sintering process at 1500° C. and 40 MPa in nitrogen atmosphere, obtaining a tungsten toughened silicon nitride ceramic sintered body.

200 g in total of silicon nitride powder (accounting for 70 wt % of the total) and graphite powder (accounting for 30 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., burying powder.

The tungsten toughened silicon nitride ceramic sintered body was buried in the above burying powder, and they were subjected to a heat treatment at 1450° C. in nitrogen atmosphere for 0.5 h, obtaining a surface hardened silicon nitride sintered body.

The material sample was subjected to bending strength, fracture toughness, hardness, and friction and wear tests.

COMPARATIVE EXAMPLE 1

100 g in total of silicon nitride powder (accounting for 90 vol % of the total), aluminum oxide powder (accounting for 6 vol % of the total), and yttrium oxide powder (accounting for 4 vol % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 2 h, obtaining a mixed slurry.

The mixed slurry was dried in an oven at 60° C. for 5 h, and the resulting dried mixture was screened by using an 80-mesh sieve, obtaining a mixed powder which passed through the sieve.

The mixed powder was subjected to a dry pressing at a pressure of 10 MPa and then to an isostatic compaction at a pressure of 200 MPa, thereby being formed to a preform. The preform was sintered at 1750° C. and a nitrogen pressure of 10 MPa for 2 h, obtaining a silicon nitride sintered body.

The silicon nitride sintered body, which was not subjected to a heat treatment in a bury powder, was subjected to bending strength, fracture toughness, hardness, and friction and wear tests.

COMPARATIVE EXAMPLE 2

100 g in total of silicon nitride powder (accounting for 80 vol % of the total), tungsten metal powder (accounting for 10 vol % of the total), aluminum oxide powder (accounting for 6 vol % of the total), and yttrium oxide powder (accounting for 4 vol % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 2 h, obtaining a mixed slurry.

The mixed slurry was dried in an oven at 60° C. for 5 h, and the resulting dried mixture was screened by using an 80-mesh sieve, obtaining a mixed powder which passed through the sieve.

The mixed powder was subjected to a dry pressing at a pressure of 10 MPa, and then to an isostatic compaction at a pressure of 200 MPa, thereby being formed to a preform. The preform was sintered at 1750° C. and a nitrogen pressure of 10 MPa for 2 h, obtaining a tungsten toughened silicon nitride ceramic sintered body.

The tungsten toughened silicon nitride ceramic sintered body, which was not subjected to a heat treatment in the burying powder, was subjected to bending strength, fracture toughness, hardness, and friction and wear tests.

COMPARATIVE EXAMPLE 3

100 g in total of silicon nitride powder (accounting for 90 vol % of the total), aluminum oxide powder (accounting for 6 vol % of the total), and yttrium oxide powder (accounting for 4 vol % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 2 h, obtaining a mixed slurry.

The mixed slurry was dried in an oven at 60° C. for 5 h, and the resulting dried mixture was screened by using an 80-mesh sieve, obtaining a mixed powder which passed through the sieve.

The mixed powder was subjected to a dry pressing at a pressure of 10 MPa, and then to an isostatic compaction at a pressure of 200 MPa, thereby being formed to a preform. The preform was sintered at 1750° C. and a nitrogen pressure of 10 MPa for 2 h, obtaining silicon nitride sintered body.

200 g in total of silicon nitride powder (accounting for 50 wt % of the total) and graphite powder (accounting for 50 wt % of the total) were put into a ball milling tank (made of silicon nitride) of a planetary ball mill. 200 g of silicon nitride ball milling beads and 300 g of anhydrous ethanol were added thereto. The planetary ball mill (rpm=300) was operated for 0.5 h, obtaining a slurry. The slurry was dried in an oven at 60° C. for 5 h, and the resulting dried mixture was screened by using a 20-mesh sieve, obtaining those passing through the sieve, i.e., burying powder.

The silicon nitride sintered body was buried in the above burying powder, and they were subjected to a heat treatment at 1300° C. in nitrogen atmosphere for 2 h, obtaining a silicon nitride sintered body. It was then subjected to bending strength, fracture toughness, hardness, and friction and wear tests.

Table 1 shows results of the bending strength, fracture toughness, hardness, and friction and wear tests of silicon nitride ceramic sintered body obtained in Examples 1 to 8 and Comparative Examples 1 to 3. Examples 1 to 8 were preformed according to technical solutions of the present disclosure. In Comparative Example 1, a silicon nitride sintered body was prepared by not introducing the metal tungsten grain boundary phase and performing the heat treatment without burying in a burying powder including a carbon source. In Comparative Example 2, a silicon nitride sintered body was prepared by introducing the metal tungsten grain boundary phase and performing a heat treatment without burying in a burying powder including a carbon source. In Comparative Example 3, a silicon nitride sintered body was prepared by not introducing the metal tungsten grain boundary phase and performing a heat treatment with burying in a burying powder including a carbon source. By comparing Examples 1 to 8 with Comparative Example 1, it can be seen that after introducing metal tungsten and a heat treatment with burying in a burying powder, the bending strength of the silicon nitride ceramic sintered body is slightly changed, while the fracture toughness, Vickers hardness and wear resistance thereof are effectively improved. By comparing Comparative Example 1 with Comparative Example 2, it can be seen that the introduction of metal tungsten grain boundary phase alone can improve the fracture toughness and wear resistance of the silicon nitride ceramic sintered body, but reduce its Vickers hardness to a certain extent, due to the absence of a hard surface layer on the surface which includes tungsten carbide particles. Further in conjunction with Examples 1 to 8, the formation of a phase comprising tungsten carbide particles by a heat treatment with burying in a burying powder is the key to improve Vickers hardness. From Comparative Example 3, it can be seen that, the Vickers hardness of silicon nitride sintered body can not be improved by simply a heat treatment with burying in a burying powder including a carbon source but not introducing a metal tungsten grain boundary phase, and that, in terms of the improvement of the surface hardness, it is critical to form tungsten carbide in the surface layer by introducing a metal tungsten grain boundary phase and then performing a heat treatment with burying in a burying powder including a carbon source. From the microscopic analysis, it shows that in Examples 1 to 8, in the surface layer of the sintered body (with a thickness of 500 μm or so), tungsten mainly exists in the form of tungsten carbide (WC), while tungsten mainly exists in the form of metal tungsten phase in the inner. In Comparative Example 2, tungsten either in the surface layer or in the inner is in the form of metal tungsten elementary substance.

TABLE 1 shows the strength, toughness, heat resistance and other properties of the silicon nitride sintered body prepared in Examples and Comparative Examples

| Examples No. | Bending strength (MPa) | Room temperature fracture toughness (MPa · m$^{1/2}$) | Vickers hardness of the surface layer (GPa) | Wear rate ($10^{-6}$ mm$^3$N$^{-1}$m$^{-1}$) |
|---|---|---|---|---|
| Example 1 | 1051 | 9.2 | 16.2 | 0.65 |
| Example 2 | 1033 | 9.6 | 17.1 | 0.62 |
| Example 3 | 1067 | 8.9 | 15.9 | 0.77 |
| Example 4 | 997 | 9.7 | 18.1 | 0.41 |
| Example 5 | 1061 | 9.1 | 16.4 | 0.89 |
| Example 6 | 1103 | 8.8 | 16.2 | 1.24 |
| Example 7 | 1127 | 8.7 | 16.0 | 1.37 |
| Example 8 | 1001 | 9.1 | 15.9 | 0.68 |
| Comparative Example 1 | 1054 | 7.9 | 14.1 | 4.70 |
| Comparative Example 2 | 1002 | 9.1 | 13.3 | 2.07 |
| Comparative Example 3 | 1023 | 7.7 | 14.0 | 4.81 |

Although the above examples give a detailed description of the present disclosure, they are only part of the examples of the present disclosure, not all of them. Other examples can also be obtained without creativity according to these examples. which fall within the scope of the present disclosure.

What is claimed is:

1. A silicon nitride ceramic sintered body, comprising
a sintered bulk; and
a hard surface layer having a thickness of 10-1000 μm, formed on a surface of the sintered bulk,
wherein the sintered bulk comprises a first silicon nitride crystalline phase and a first grain boundary phase, and the hard surface layer comprises a second silicon nitride crystalline phase and a second grain boundary phase,
wherein the first grain boundary phase comprises a metal tungsten phase, the metal tungsten phase being tungsten elementary substance and/or a tungsten alloy;
wherein the second grain boundary phase comprises tungsten carbide particles;
wherein tungsten element in the metal tungsten phase accounts for 80-100 wt % of total tungsten element in the first grain boundary phase; and
wherein tungsten carbide element in the tungsten carbide particles accounts for 60-100 wt % of total tungsten element in the second grain boundary phase,
wherein the silicon nitride ceramic sintered body is prepared by a method comprising steps of
burying a tungsten toughened silicon nitride ceramic sintered body in a burying powder; and
subjecting the tungsten toughened silicon nitride ceramic sintered body to a heat treatment for a carbonization reaction, to obtain the silicon nitride ceramic sintered body,
wherein the burying powder comprises a carbon source; and
the heat treatment is performed at a temperature of 1100-1450° C. for 0.5-5 h;
wherein the tungsten toughened silicon nitride ceramic sintered body is prepared by a process comprising steps of
mixing and ball milling a silicon nitride source, a metal tungsten grain boundary phase precursor, and a sintering assistant, to obtain a mixed powder, the metal tungsten grain boundary phase precursor being at least one selected from the group consisting of tungsten elementary substance, and a tungsten alloy; and
forming the mixed powder into a preform, and sintering the preform in a nitrogen atmosphere, to obtain the tungsten toughened silicon nitride ceramic sintered body,
wherein the sintering is performed at a temperature of 1600-1900° C. and at a nitrogen pressure of not less than 0.3 MPa.

2. The silicon nitride ceramic sintered body as claimed in claim 1, wherein the metal tungsten phase and tungsten carbide particles account for 0.5 to 35 vol % of the silicon nitride ceramic sintered body.

3. The silicon nitride ceramic sintered body as claimed in claim 1, wherein the first silicon nitride crystalline phase in the sintered bulk and the second silicon nitride crystalline phase in the hard surface layer account for 50 to 90 vol % of the silicon nitride ceramic sintered body.

4. The silicon nitride ceramic sintered body as claimed in claim 1, wherein the tungsten carbide particles have an average particle size of 0.5 to 50 μm.

5. A method for preparing the silicon nitride ceramic sintered body as claimed in claim 1, comprising steps of
burying a tungsten toughened silicon nitride ceramic sintered body in a burying powder; and
subjecting the tungsten toughened silicon nitride ceramic sintered body to a heat treatment for a carbonization reaction, to obtain the silicon nitride ceramic sintered body,
wherein the tungsten toughened silicon nitride ceramic sintered body comprises a third silicon nitride crystalline phase and a metal tungsten grain boundary phase, the metal tungsten grain boundary phase being tungsten elementary substance and/or a tungsten alloy; and
wherein the burying powder comprises a carbon source; the heat treatment is performed at a temperature of 1100-1450° C. for 0.5-5 h;
wherein the tungsten toughened silicon nitride ceramic sintered body is prepared by a process comprising steps of
mixing and ball milling a silicon nitride source, a metal tungsten grain boundary phase precursor, and a sintering assistant, to obtain a mixed powder, the metal tungsten grain boundary phase precursor being at least one selected from the group consisting of tungsten elementary substance, and a tungsten alloy; and
forming the mixed powder into a preform, and sintering the preform in a nitrogen atmosphere, to obtain the tungsten toughened silicon nitride ceramic sintered body,
wherein the sintering is performed at a temperature of 1600-1900° C. and at a nitrogen pressure of not less than 0.3 MPa.

6. The method as claimed in claim 5, wherein the carbon source accounts for 20-100 wt % of the burying powder.

7. The method as claimed in claim 5, wherein the silicon nitride source accounts for 60-90 vol % of the mixed powder, and the metal tungsten grain boundary phase precursor accounts for 0.5-35 vol % of the mixed power.

8. The silicon nitride ceramic sintered body as claimed in claim 2, wherein the first silicon nitride crystalline phase in the sintered bulk and the second silicon nitride crystalline phase in the hard surface layer account for 50 to 90 vol % of the silicon nitride ceramic sintered body.

9. The silicon nitride ceramic sintered body as claimed in claim 2, wherein the tungsten carbide particles have an average particle size of 0.5 to 50 μm.

10. The method as claimed in claim 5, wherein the metal tungsten phase and tungsten carbide particles account for 0.5 to 35 vol % of the silicon nitride ceramic sintered body.

11. The method as claimed in claim 5, wherein the first silicon nitride crystalline phase in the sintered bulk and the second silicon nitride crystalline phase in the hard surface layer account for 12 to 90 vol % of the silicon nitride ceramic sintered body.

12. The method as claimed in claim 5, wherein the tungsten carbide particles have an average particle size of 0.5 to 50 μm.

* * * * *